May 26, 1931. W. MARSHALL 1,807,298
DECK CONSTRUCTION FOR VEHICLE BODIES
Filed Dec. 13, 1926 3 Sheets-Sheet 1
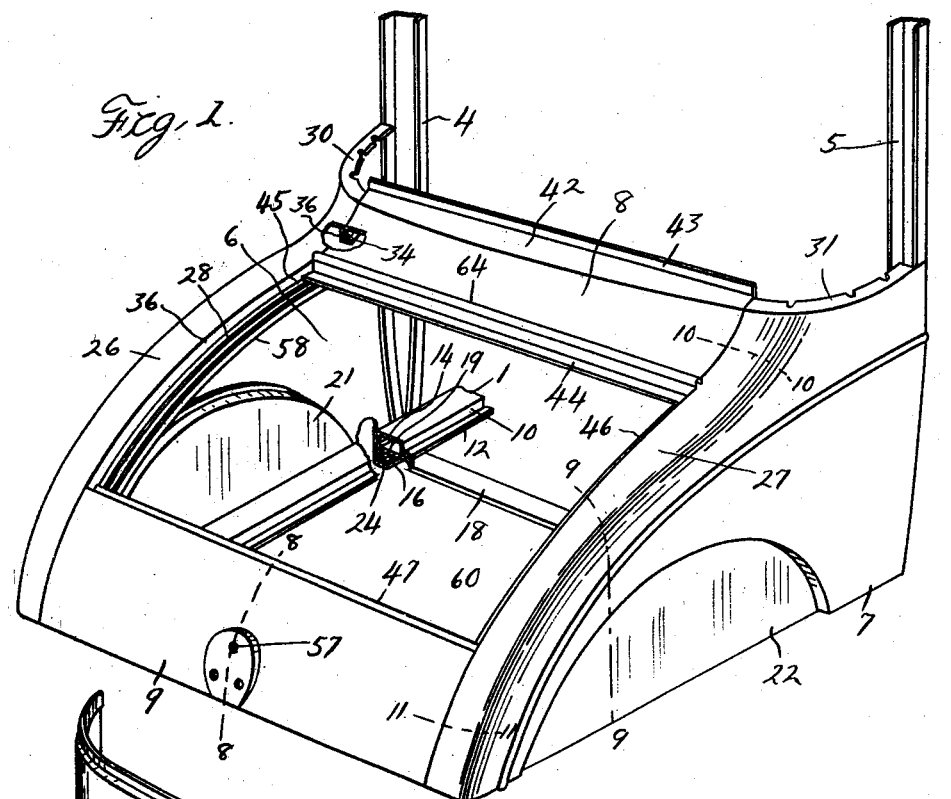
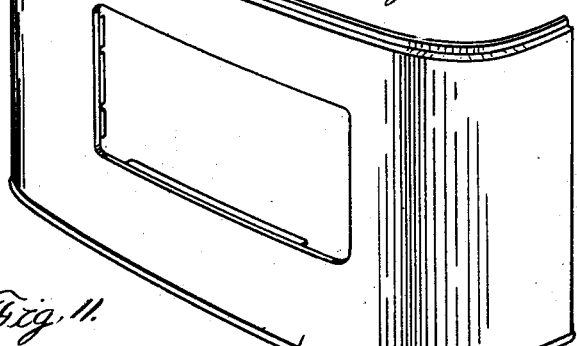
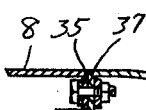
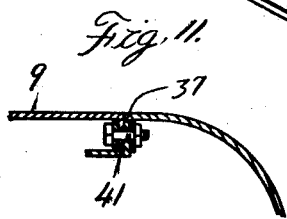
Inventor
William Marshall
By Whittemore Hulbert Whittemore
+Belknap
Attorneys

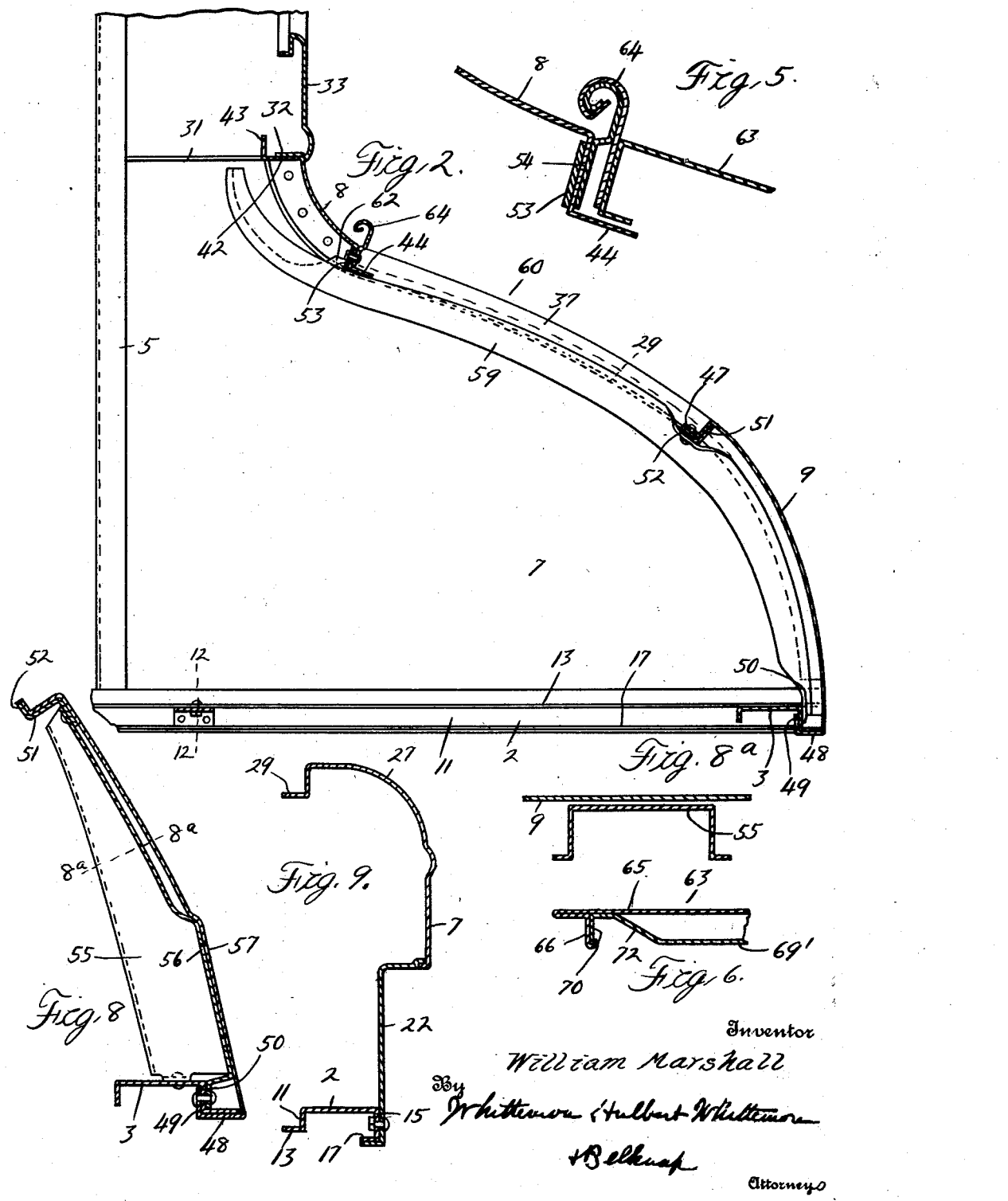

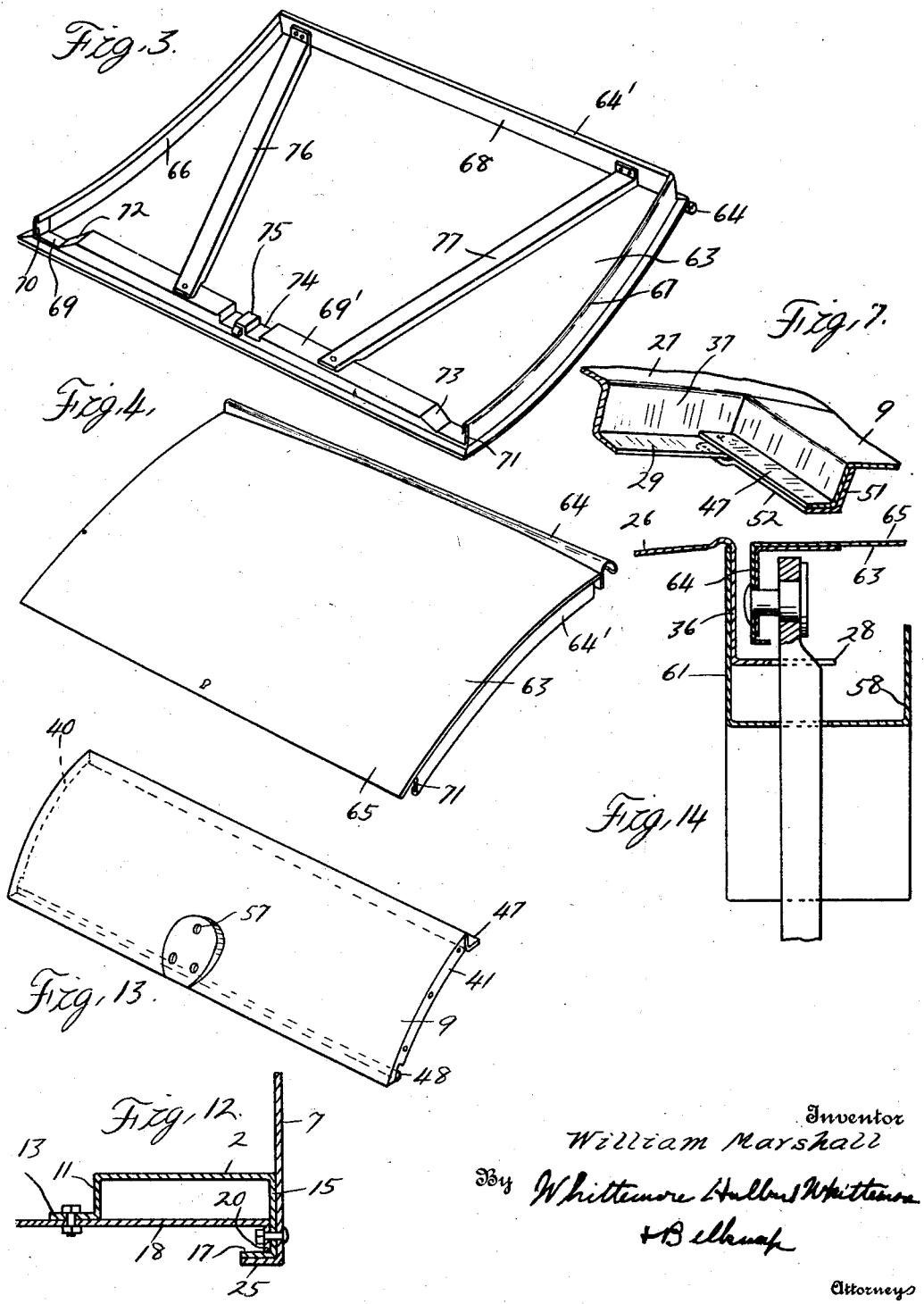

Patented May 26, 1931

1,807,298

UNITED STATES PATENT OFFICE

WILLIAM MARSHALL, OF DETROIT, MICHIGAN, ASSIGNOR TO BRIGGS MANUFACTURING COMPANY, OF DETROIT, MICHIGAN, A CORPORATION OF MICHIGAN

DECK CONSTRUCTION FOR VEHICLE BODIES

Application filed December 13, 1926. Serial No. 154,586.

This invention relates generally to rear deck constructions of vehicle bodies and consists of certain novel features of construction, combinations and arrangements of parts as will be hereinafter more fully described and particularly pointed out in the appended claims.

In the accompanying drawings:

Figure 1 is a fragmentary perspective view of a vehicle body with the deck lid removed.

Figure 2 is a vertical sectional view through the construction shown in Figure 1 and showing the lower back panel of the body applied to the upper deck panel.

Figure 3 is a bottom perspective view of the deck lid.

Figure 4 is a top perspective view of the deck lid.

Figure 5 is a fragmentary vertical sectional view of the upper deck panel and showing the deck lid applied thereto.

Figure 6 is a fragmentary vertical sectional view of the deck lid.

Figure 7 is a fragmentary perspective view of the construction shown in Figure 1.

Figure 8 is a vertical sectional view taken on the line 8—8 of Figure 1.

Figure 8A is a fragmentary cross sectional view taken on the line 8A—8A of Figure 8.

Figure 9 is a vertical sectional view taken on the line 9—9 of Figure 1.

Figure 10 is a fragmentary cross sectional view taken on the line 10—10 of Figure 1.

Figure 11 is a cross sectional view taken on the line 11—11 of Figure 1.

Figure 12 is a fragmentary cross sectional view taken on the line 12—12 of Figure 2.

Figure 13 is a perspective view of the lower back panel of the body.

Figure 14 is a cross sectional view through the construction shown in Figure 1.

Figure 15 is a perspective view of the back panel of the vehicle body.

Referring now to the drawings, 1 and 2 respectively are side sills, 3 is a cross bar at the rear end of the sills, 4 and 5 respectively are rear quarter pillars, 6 and 7 respectively are side panels, and 8 and 9 respectively are transversely extending upper and lower deck panels of a vehicle body of the coupe or closed type. As shown, the sills 1 and 2 are channel-shape and are arranged in inverted position. The inner sides 10 and 11 respectively of the sills are provided at their lower edges with inwardly extending lateral flanges 12 and 13 respectively, while the outer sides 14 and 15 respectively of these sills project below the inner sides 11 and 12 and have inturned lateral flanges 16 and 17 respectively at their lower edges. The cross bar 3 is also channel-shape and is arranged in inverted position between said sills. As shown in Figure 12 the base 18 of the cross bar is secured to the inturned flanges 12 and 13 respectively of the sills, and is provided at its opposite ends with depending flanges 19 and 20 that are secured to the outer sides 14 and 15 respectively of the sills. The rear quarter pillars 4 and 5 are preferably channel-shape in form and are secured at their lower ends to the side sills 1 and 2 respectively. The side panels 6 and 7 preferably extend from the rear quarter pillars 4 and 5 to the rear cross bar 3 and are provided at their rear ends with inwardly offset portions 21 and 22 respectively which constitute wheel housings. Preferably the side panels 6 and 7 are bolted to the outer sides 14 and 15 respectively of the side sills and are provided at their lower edges with lateral flanges 24 and 25 respectively which extend inwardly under the inturned flanges 16 and 17 respectively of the sills. In this instance the side panels 6 and 7 have lateral portions 26 and 27 which extend inwardly and constitute portions of the rear deck of the vehicle body. As shown the inner edges of these lateral portions 26 and 27 are substantially parallel and are provided throughout their length with depending L-shaped stiffening flanges 28 and 29 respectively. Suitable inturned lateral flanges 30 and 31 respectively extend along the upper edges of the side panels from the L-shaped flanges 28 and 29 respectively to the rear quarter pillars 4 and 5 and are attached to a suitable inturned flange 32 at the lower edge of the lower back panel 33. The transversely extending upper and lower deck panels 8 and 9 are preferably located at the upper and lower ends of the inturned lateral portions 26 and 27 respectively of the side panels and are terminally secured thereto. As shown the upper deck panel 8 is provided at its opposite ends with depending flanges 34 and 35 respectively that are bolted to the upstanding walls 36 and 37 respectively of the L-shaped flanges 28 and 29, and the lower panel 9 is also provided at its opposite ends with depending flanges 40 and 41 respectively which are bolted to the upstanding walls 36 and 37 respectively of the flanges 28 and 29. Preferably the upper panel 8 is provided along its upper edge with a forwardly projecting lateral flange 42 that is secured to the lateral flange 32 of the lower back panel 33 and terminates at its forward edge with an upstanding stiffening flange 43. This upper panel 8 is also provided along its lower edge with a depending L-shaped flange 44 that rests upon the horizontal portions 45 and 46 respectively of the L-shaped flanges 28 and 29. The lower panel 9 is provided along its upper edge with a depending L-shaped flange 47 that rests upon the horizontal portions 45 and 46 of the flanges 28 and 29 and is provided along its lower edge with a lateral flange 48 that extends forwardly beneath the rear cross member 3 and preferably terminates at its forward edge with an upstanding flange 49 that in turn is rigidly secured to the rear side 50 of said cross bar.

To reinforce the structure, I have provided a reinforcing bar 51 that is L-shape in cross section and that is secured to the L-shaped flange 47 of the lower panel 9. As shown in Figure 7 the web 52 of this bar extends beneath and is rigidly secured to the portions 45 and 46 of the L-shaped flanges 28 and 29. The upper panel 8 is also reinforced by a metal strip 53 that is secured to the end flanges 34 and 35 and the vertical portion 54 of the L-shaped flange 44 so as to reinforce the corners and thereby prevent the metal from tearing. A channel-shaped bracket 55 is also positioned centrally of the lower back panel 9 and is terminally secured to the L-shaped flange 47 thereof and to the rear cross bar 3. Suitable aligned openings 56 and 57 are provided in the base of this bracket and the lower back panel 9 to receive suitable securing elements for a tire carrier and the like.

Suitable drip troughs 58 and 59 respectively are also preferably provided to carry off water draining from the deck into the opening 60 formed between the upper and lower panels 8 and 9 and the portions 26 and 27 of the side panels. As shown, these drip troughs are channel-shape in form and extend downwardly at each side of the opening 60 from a point approximately in line with the upper edge of the upper panel 8 to a point slightly below the lower cross bar 3. Preferably the outer walls 61 and 62 respectively of said troughs project higher than the inner walls thereof and are rigidly secured to the vertical portions 36 and 37 respectively of the L-shaped flanges 28 and 29. Normally this opening 60 is closed by means of a suitable lid or cover 63 which is connected at its upper forward edge to a suitable hinge 64 secured to the L-shaped flange 44 of the upper panel 8. Thus, water entering the opening 60 when the lid 63 is closed will flow upon the L-shaped flanges 28 and 29 and will drain therefrom into the channel-shaped drip troughs 58 and 59 which will carry the water off and thereby prevent damage to the interior of the vehicle body.

The deck lid 63 may be any suitable construction but in the present instance preferably comprises a rigid frame 64' and the outer sheet metal covering 65. As shown, the side bars 66 and 67 and the forward cross bar 68 are similar in construction, while the rear cross bar 69 is provided for a portion of its length with a channel-shaped portion 69' and has the lateral flanges 70 and 71 that are rigidly secured to the side bars 66 and 67. As shown, the ends of the channel portion 69' has inclined walls 72 and 73 which merge into the flanges 70 and 71 and is provided intermediate its ends with a depressed portion 74 that receives a suitable lock 75 for the lid. Two diagonal braces 76 and 77 respectively are terminally connected to the cross bars 68 and 69 to reinforce the structure.

Thus, from the foregoing description, it will be readily apparent that I have provided a strong and durable body construction that is built up of a plurality of units which may be readily assembled. Due to this arrangement these units may be shipped separately to different parts of the country and assembled and may be readily replaced in case of accidents.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a vehicle body, the combination with a pair of side sills, a cross bar terminally secured to said sills at the rear ends thereof, rear quarter pillars secured to said sills intermediate their ends, a back panel secured to said rear quarter pillars, side panels extending from said pillars to said cross bar and having inwardly extending lateral portions, said side panels having inturned lateral flanges supporting and secured to said back panel, and a transversely extending panel terminally secured to said inwardly extending portions of said side panels and having a forwardly extending lateral flange supporting and secured to said back panel, said forwardly extending flange being provided with a stiffening flange located in advance of said back panel.

2. In a vehicle body, the combination with a pair of side sills, a cross bar terminally secured to said sills at the rear ends thereof, rear quarter pillars secured to said sills intermediate their ends, a back panel secured to said rear quarter pillars, side panels extending from said pillars to said cross bar and having inturned lateral flanges supporting and secured to said back panel, and a transversely extending panel terminally secured to said side panels and having a forwardly extending lateral flange supporting and secured to said back panel.

In testimony whereof I affix my signature.

WILLIAM MARSHALL.